July 14, 1931.  J. L. BECKER  1,814,425
COMBINATION TRACTOR GRADER
Filed April 9, 1928  4 Sheets-Sheet 1

INVENTOR
JOSEPH L. BECKER
BY
ATTORNEY

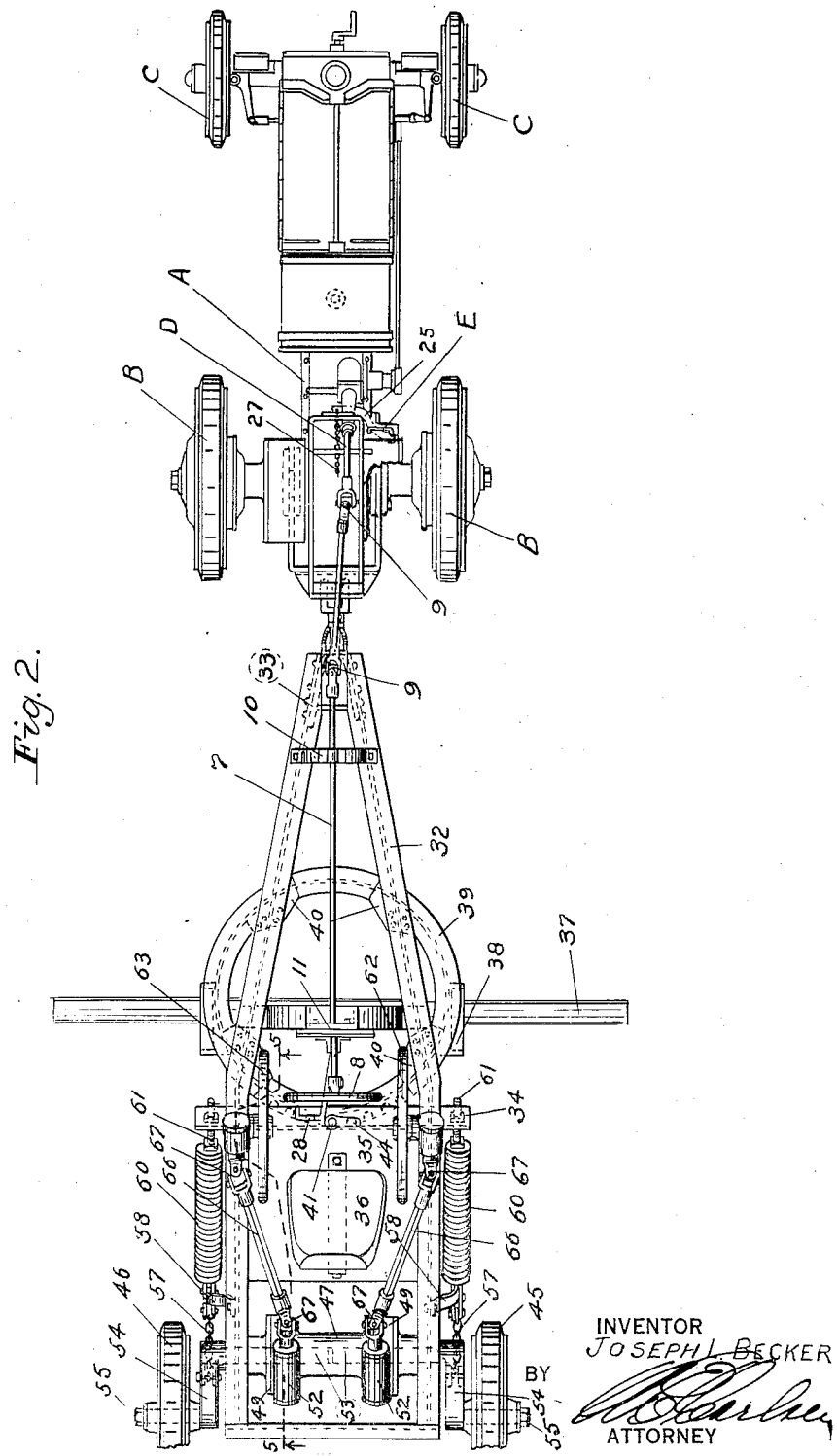

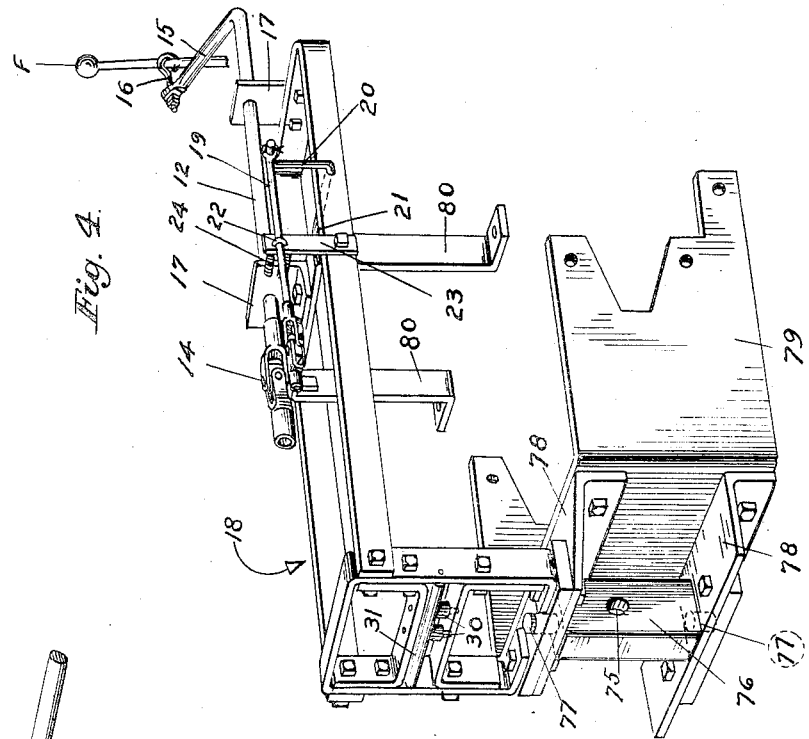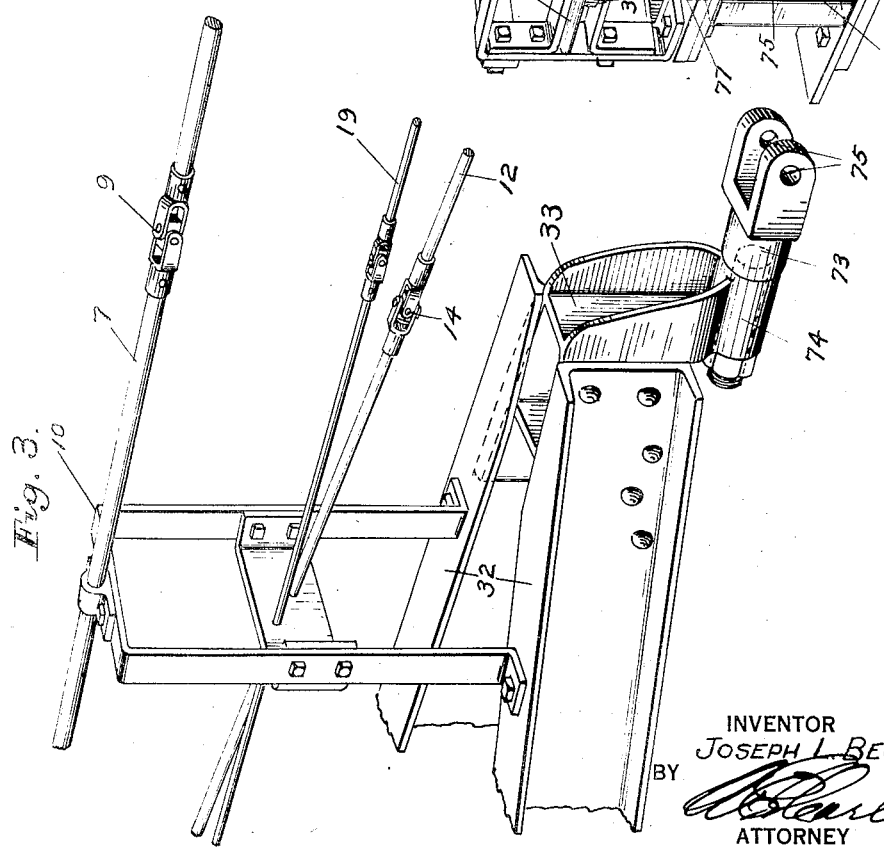

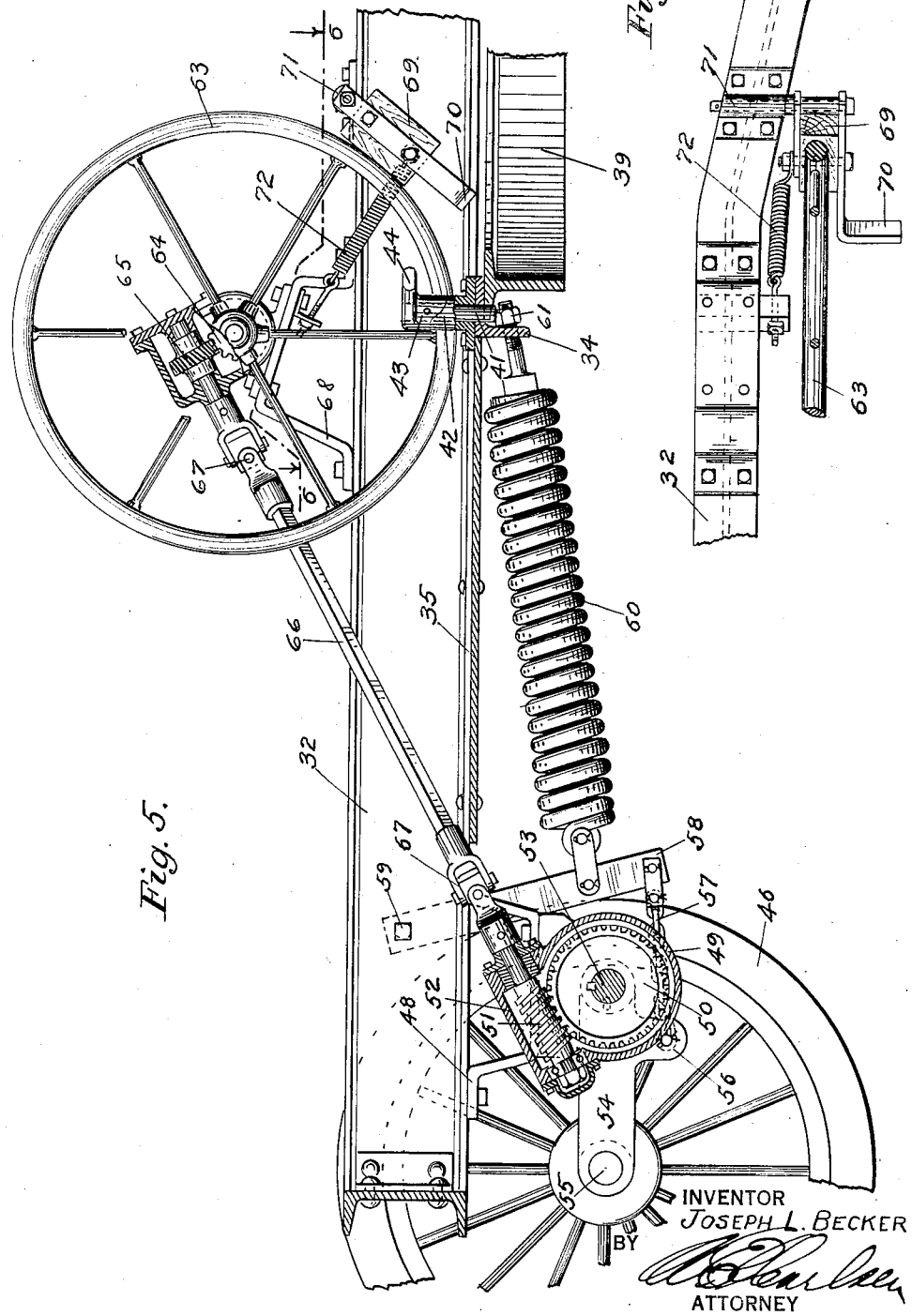

Patented July 14, 1931

1,814,425

UNITED STATES PATENT OFFICE

JOSEPH L. BECKER, OF MINNEAPOLIS, MINNESOTA

COMBINATION TRACTOR GRADER

Application filed April 9, 1928. Serial No. 268,547.

This invention relates to roadway maintenance equipment, and the primary object is to provide a comparatively simple, efficient, and practical machine of the combination tractor-grader class, in which a tractor unit is arranged in advance of the grader unit so as to draw or pull the same over the road. A further object is to provide an improved combination tractor-grader machine in which controls for both the tractor unit and the grader unit are within reach of and operative by a single operator, who is so stationed on the machine that he may have both the tractor and the grader mechanism under complete observation and control at all times. A further object is to provide a grader unit, of the class noted, and a set of tractor controls, operative from the grader unit proper, which can be easily and quickly attached to a standard form of tractor, without materially altering the latter, and which may with equal ease be detached from the tractor so that it may be used for other purposes. Further objects are to provide various new and novel devices and mechanisms for controlling the various tractor elements, for connecting the grader and tractor units, and for adjusting and controlling the various grader devices. The above and still other objects and advantages of the machine herein disclosed will be described and claimed in the following specification, reference being had to the accompanying drawings, wherein:

Fig. 2 is a plan view of the machine shown in Fig. 1.

Fig. 3 is an enlarged detail perspective view of the front end of the grader frame, and portions of certain control rods.

Fig. 4 is an enlarged detail perspective view of the frame unit which is bolted to the rear end of the tractor and which in turn supports and guides the grader frame and control rods shown in Fig. 3.

Fig. 5 is an enlarged detail elevation, partly in section, as seen substantially on the irregular line 5—5 in Fig. 2.

Fig. 6 is a detail section on the irregular line 6—6 in Fig. 5.

Figure 1:
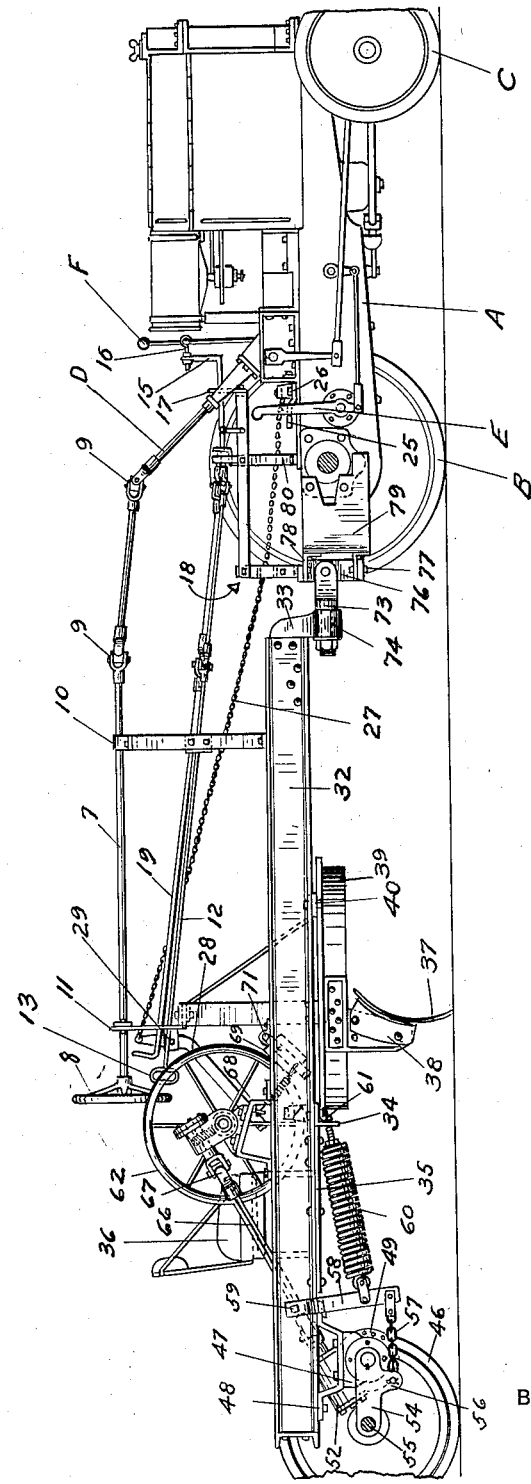
Fig. 1 is a side elevation of the entire machine, as seen from the right, various parts being broken away for purpose of illustration.

Referring to the drawings more particularly and by reference characters, A designates the main frame or body of a well known and commercial type of tractor having rear drive wheels B, front steering wheels C, a steering column D adapted to control or steer the wheels C, a clutch lever E, and a gear shift lever F, all of which in structure and operation remain unchanged in the tractor, except that the usual hand wheel of the steering column is removed and substituted by an extension shaft 7 that extends back to the operator's station on the machine, where the hand wheel of the tractor may be applied as at 8. The shaft 7 is sectionally formed, having universal joints 9 so as to allow for the angling of the tractor with respect to the grader unit when the machine is turned. The rear part of the shaft 7 is carried in suitable bearing brackets 10, and 11, extending up from the grader frame. The gear shift lever F is operated from the operator's station on the grader, by a sectionally formed shaft 12, having a handle 13 at its rear end, intermediate universal joints 14 (corresponding to joints 9) and a crank arm 15 at its forward end which is connected, as at 16, to the shift lever F (see Figures 1 and 4). Thus when the handle 13 is turned, to right or left, the lever F will be shifted, transversely, and when it is pulled or pushed the shift lever will be moved forwardly and rearwardly to effect the proper speed adjustments to the tractor, as may be desired. The foremost section of the shaft 12 is slidably journaled in bearings 17 of a frame 18, while the longer rearmost section is mounted for sliding and rotating engagement in the bearing standards 10 and 11. A third shaft or control rod 19 is mounted and constructed similarly to the shafts 7 and 12, and connects, at its forward extremity, with the crank 20 at one end of a cross shaft 21, the other end of which is connected in any suitable manner (not shown)

with the carbureter or other speed control element of the tractor engine. Because of the relatively sensitive response of the tractor engine to slight carbureter or gas adjustments, and in order that the set speed adjustments may not be affected by vibration or jars, or by reason of the swinging action of the grader unit with respect to the tractor unit, it is necessary to firmly hold the rod 19, with respect to the tractor, and yet permit of its proper adjustment from the grader unit. To accomplish this, I secure the forward section of the rod 19 in the loop end of a U-bolt 22 (Fig. 4), and secure the bolt in a bracket 23, mounted on the frame 18. The legs of the bolt are then provided with springs 24 which tend to clamp the rod 19 between the bracket 23 and the loop of the bolt. Thus the rod is held against accidental movement, but the bolt is sufficiently loose to permit a sliding movement of the rod under manual effort.

The clutch lever E is operated from the grader station, as follows: A lever 25 is mounted on the tractor, (preferably by a bolt 26 that was previously used to secure the now removed seat standard) and one end of it is arranged to press forwardly against the lever E, when its other end is moved rearwardly. This movement is effected by a flexible cable or chain 27, attached to said other end of the lever 25, and whose rear end is secured to a foot lever 28 that is pivotally mounted, as at 29, to the standard 11. The chain 27 guides between a pair of short vertical rollers 30, and operates under a horizontal roller 31 (Fig. 4). These rollers are all mounted in the forward end of the frame 18, directly above the vertical pivot center connection between the tractor and grader units, with a result that the control chain 27 will not effectively vary in length when the tractor and grader units are angularly adjusted with respect to each other.

The tractor controls having been described, attention will now be directed to the grader construction and its particular functions and advantages.

The greader unit proper has a substantially rectangular channel iron main frame 32, the side bars of which, however, converge forwardly where they are secured to and joined by a casting 33. At an intermediate point the side bars are connected by a cross beam 34, that projects laterally beyond the frame, and are also connected by a platform 35, upon which is secured the operator's seat or station 36, or upon which the operator may stand if he so desires. All of the tractor and grader controls are within convenient reach of the operator when he is so stationed.

The grader blade 37 is adjustably secured, by brackets 38 to a T-steel circle 39, which in turn is secured by suitable brackets 40 to the frame 32, so that it may be turned, upon a vertical center, to adjust the working angle of the blade with respect to the longitudinal axis of the machine. To prevent accidental rotation or adjustment of the circle, I provide its outer flange with notches adapted to be selectively engaged by a locking pin 41. This pin is rotatably and slidably secured in a bearing member 42, secured on the beam 34, and has a head 43 with a handle 44, by which it may be operated. As shown in Fig. 5, the head 43 has a cam acting contact with the bearing member 42, with a result that the pin 41 is lifted up out of engagement with the circle 39, when the handle 44 is turned, and, conversely, when the handle is returned to its initial position the pin may again drop down. It will thus be seen that the circle is released by a turn of the handle 44, and may then be manually turned until the blade 37 is at the desired operating angle. In actual practice, however, it is more convenient to effect the adjustment by releasing the pin, while the machine is moving forward, and then scraping one end of the blade upon the road until it moves back the desired distance, at which time the pin 41 is released to re-engage and lock the blade holding circle.

It will be noted that the blade 37 is not tiltably adjustable in a transverse direction, with respect to the frame 32, but is rigidly connected therewith, with a result that there is no slack or play in the blade, with respect to the main frame, as occurs in machines where the blade is suspended by links, levers, etc., and consequently the entire weight of the grader frame unit is utilized to rigidly hold and sustain the blade against jars and vibrations such as occur when it strikes hard and uneven spots in the road surface. It will thus be seen that the blade will always travel and operate at a predetermined uniform angle, and will not be upset or materially influenced by unusual road conditions, due to the fact that the entire weight of the machine is applied to it when the resistance is variable or great.

It is obviously necessary, however, to provide means for adjusting the transverse angle or inclination of the blade, and this I do, not by adjusting the blade with respect to the frame, but by adjusting the frame proper with respect to the axes of the wheels 45 and 46, which support the rear end of the frame. It may here be noted that the rear wheels 45 and 46 are laterally spaced, and that they travel on the road surface that has been traversed, by the grader blade 37, with a result that the angle or transverse inclination of the blade, as set by the operator, will always be parallel with and be held at a uniform position with respect to the graded and not the ungraded surface of the road.

The device I employ for transversely adjusting the main frame 32 with respect to the rear supporting wheels 45 and 46 will now be described, as follows; particular reference being had to Figs. 1, 2, 5 and 6.

An axle housing 47 extends transversely across the frame 32, and is rigidly secured thereto, as by brackets 48. The housing 47 is provided wih two spaced enlargements 49 in which operate a pair of worm gears 50 that mesh with worms 51 journaled in chamber extensions 52 of the members 49. The gears 50 are respectively mounted on shaft sections 53 that are journaled in the housing 47 and extend thereinto from the ends thereof. At their outer ends the shaft sections 53 are provided with crank arms 54, the rear ends of which have stub axles 55 for supporting engagement in the hubs of the wheels 45 and 46. The cranks 54 have depending extensions 56, connected by short chain sections 57 to a pair of levers 58, the upper ends of which fulcrum at 59, to the frame 32. The levers 58 are yieldingly pulled forward under the contracting action of a pair of powerful compensating springs 60, the front ends of which are adjustably secured, as at 61, to the projecting ends of the cross beam 34. It will thus be seen that the wheels 45 and 46 support the entire rear part of the grader mechanism, but that under the action of the compensating springs 60 it requires but comparatively little power, to the worms 51, to raise and lower either or both sides of the grader frame, yet, the springs 60 will not permit a yielding or spring action to the frame 32, because of the locking effect of the gears 50 and 51. The control worms 51 are manually operated by laterally disposed hand wheels 62 and 63, through the medium of suitably encased intermeshing pinions 64, 65, and shafts 66, having universal joints 67. The hand wheels 62 and 63 are carried by suitable bearing brackets 68 of the main frame 32.

Referring to Figs. 1, 5 and 6, it will be noted that I have provided the elevating, hand wheels 62, 63 with brake blocks 69, carried by pedals or foot levers 70, that fulcrum as at 71, to the frame 32, and are held rearwardly in frictional contact with the hand wheels by adjustable springs 72. The gears 50, 51, 64 and 65 are so ratioed or proportioned, with respect to the weight of the machine and the resistance of the springs 60, that the various parts may normally remain, as adjusted, when the machine is standing still. But when the machine is in action, and subject to the vibrations occasioned thereby, there will be a tendency for the frame to settle downwardly, thus causing the various gears and the hand wheels to rotate. This tendency is fully overcome by the brakes 69, but is provided for in order that either or both sides of the frame and blade may be lowered, when the operator so desires, merely by releasing either or both brakes, and in which event it is possible for him to effect his object without manually turning the handwheels.

Attention is now directed to the tractor grader trailing connection, as shown in Figs. 1, 3 and 4. A connector bar or link 73 has a longitudinal swivel support in a bearing portion 74 of the casting 33. This connection permits of the previously described transverse angular adjustment of the grader frame 32 and the blade 37 it supports. The forward end of the link has a transverse pivot connection 75 with a block 76, and provides for the required vertical action of the grader unit with respect to the tractor unit. The block 76 is mounted for pivoting action on a vertical axis, as at 77, in the bracket extensions 78 of a yoke plate 79, and provides freedom for lateral swinging movement of the grader, as it trails or follows behind the steered tractor unit. The yoke member 79 is bolted upon the rear end of the body portion of the tractor, and supports the rear end of the frame 18, the forward portion of which has an inverted U-support bar 80. It will be noted, in Fig. 4, that the various members 18, 80, 78, 79 are all assembled together, in one unit, with a result that said unit can be very quickly secured to and removed from the tractor.

It is understood that suitable modifications may be made in the general design and structural details of the invention as herein shown, provided, however, that said modifications come within the spirit and scope of the appended claims. Having now therefore fully shown and described my invention, what I claim to be new and desire to protect by Letters Patent is:

1. A road grading machine comprising a transversely tiltable frame, a grade blade secured under and to the frame so as to be transversely tiltable and vertically adjustable therewith, a pair of laterally disposed crank members pivotally secured to the rear end of the frame, ground wheels secured to the cranks, worm wheels for oscillating the cranks to adjust the frame and grade blade with respect to the ground wheels, manually operated worm screws for actuating the worm wheels, a pair of lever members fulcrumed to the frame and having connections with the respective cranks, and counterbalancing spring means connecting said levers with the frame.

2. A road grading machine comprising a transversely tiltable frame, a grader blade secured under and to the frame so as to be transversely tiltable and vertically adjustable therewith, a pair of laterally disposed crank members pivotally secured to the rear end of the frame, ground wheels secured to the cranks, worm wheels for oscillating the cranks to adjust the frame and grader blade with respect to the ground wheels, worm screws for operating the worm wheels, a pair of hand wheels mounted on the frame, an operator's station arranged substantially between and slightly rearward of the hand wheels, pinions operated by the hand wheels, shafts extending from the respective pinions to the worm screws and disposed at rearwardly converging angles with respect to the longitudinal axis of the frame, universal joints connecting the rear ends of said shafts to the worm screws, and universal joints connecting the front ends of said shafts to the said pinions.

3. A road grading machine comprising a transversely tiltable frame, a grader blade secured under and to the frame so as to be transversely tiltable and vertically adjustable therewith, a pair of laterally disposed crank members pivotally secured to the rear end of the frame, ground wheels secured to the cranks, means for oscillating the cranks to adjust the frame and grader blade with respect to the ground wheels, a pair of lever members fulcrumed to opposite sides of the frame, counterbalancing spring means connecting the frame with said levers, and flexible connections between the levers and the respective cranks.

4. A road grading machine comprising a transversely tiltable frame, a grader blade secured under and to the frame so as to be transversely tiltable and vertically adjustable therewith, a pair of laterally disposed crank members pivotally secured to the rear end of the frame, ground wheels secured to the cranks, means for oscillating the cranks to adjust the frame and grader blade with respect to the ground wheels, a pair of lever members fulcrumed to opposite sides of the frame, counterbalancing spring means connecting the frame with said levers, and connections between said cranks and levers, said connections being attached to the levers at greater distances from the fulcrums thereof than the distances between said fulcrums and the points of attachment to the levers by the said spring means.

In testimony whereof I affix my signature.

JOSEPH L. BECKER.